United States Patent
Xu et al.

(10) Patent No.: US 9,867,094 B2
(45) Date of Patent: Jan. 9, 2018

(54) METHOD AND APPARATUS FOR HANDOVER IN MOBILE CONTENT CENTRIC NETWORK

(71) Applicant: Samsung Electronics Co., Ltd., Gyeonggi-do (KR)

(72) Inventors: Jiangwei Xu, Gyeonggi-do (KR); Sang-Jun Moon, Gyeonggi-do (KR); Yong-Seok Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 676 days.

(21) Appl. No.: 13/913,186

(22) Filed: Jun. 7, 2013

(65) Prior Publication Data

US 2013/0329696 A1 Dec. 12, 2013

(30) Foreign Application Priority Data

Jun. 8, 2012 (KR) .................. 10-2012-0061487

(51) Int. Cl.
*H04W 36/02* (2009.01)
*H04W 36/16* (2009.01)
*H04W 36/00* (2009.01)

(52) U.S. Cl.
CPC ...... *H04W 36/023* (2013.01); *H04W 36/0016* (2013.01)

(58) Field of Classification Search
CPC ............. H04W 36/02; H04W 36/0055; H04W 84/047; H04W 92/20; H04W 36/0016; H04W 36/023
See application file for complete search history.

(56) References Cited

U.S. PATENT DOCUMENTS

| 5,940,371 A * | 8/1999 | Mitts | H04L 1/1829 370/236 |
| 7,436,796 B2 * | 10/2008 | Takeuchi | H04W 36/02 370/328 |

(Continued)

FOREIGN PATENT DOCUMENTS

| EP | 2387273 A2 | 11/2011 |
| EP | 2439991 A1 | 4/2012 |
| JP | 2009-296616 | 12/2009 |

OTHER PUBLICATIONS

International Search Report dated Oct. 1, 2013 in connection with International Patent Application No. PCT/KR2013/005045, 3 pages.
Written Opinion of the International Searching Authority dated Oct. 1, 2013 in connection with International Patent Application No. PCT/KR2013/005045, 5 pages.
Jihoon Lee et al., "Proxy-assisted Content Sharing Using Content Centric Networking (CCN) for Resource-limited Mobile Consumer Devices", IEEE Transactions on Consumer Electronics, vol. 57, Issue 2, May 2011, 7 pages.

(Continued)

*Primary Examiner* — Benjamin H Elliott, IV
*Assistant Examiner* — Prince A Mensah

(57) ABSTRACT

A handover method in a mobile CCN. In the method, when detecting a UE performing a handover, a source local CCNx node caches data directed to the UE. The source local CCNx node transmits a request to stop transmission of the data directed to the UE to a target local CCNx node based on a condition. The target local CCNx node requests the source local CCNx node to stop transmission of contents that are being cached. The source local CCNx node transmits cached contents to the target local CCNx node. The target local CCNx node requests a CCNx entry node to stop transmission of specific contents based on a condition. The CCNx entry node transmits contents to the target local CCNx node. When detecting, the UE completing the handover, the target local CCNx node transmits the contents received from the CCNx entry node to the UE.

28 Claims, 13 Drawing Sheets

(56) References Cited

U.S. PATENT DOCUMENTS

| | | | | |
|---|---|---|---|---|
| 2002/0094813 | A1* | 7/2002 | Koshimizu | G06F 17/30902 455/436 |
| 2006/0034313 | A1* | 2/2006 | Aaltonen | H04L 1/16 370/432 |
| 2006/0072512 | A1* | 4/2006 | Das | H04W 80/00 370/335 |
| 2009/0323533 | A1* | 12/2009 | Ohta | H04W 36/02 370/236 |
| 2010/0091734 | A1* | 4/2010 | Park | H04W 92/20 370/331 |
| 2010/0151861 | A1* | 6/2010 | Nagata | H04L 1/187 455/436 |
| 2011/0280214 | A1* | 11/2011 | Lee | H04W 36/023 370/331 |

OTHER PUBLICATIONS

Bengt Ahlgren, et al., A Survey of Information-Centric Networking, <URL: http://www.cisco.com/en/US/netsol/ns827/networking_solutions_ sub_solution.html, Feb. 2, 2011, 26 pages.

Andres Mitschele-Thiel, et al., "3G Long-term Evolution (LTE) and System Architecture Evolution (SAE)", UMTS Networks, Nov. 2011, 66 pages.

Extended European Search Report dated Mar. 23, 2016 in connection with European Application No. 13800643.2, 10 pages.

Van Jacobson, et al., "Networking Named Content", CONEXT 2009 Proceedings of the 5th International Conference on Emerging Networking Experiments and Technologies, Dec. 1, 2009, Rome, Italy, 12 pages.

* cited by examiner

METHOD AND APPARATUS FOR HANDOVER IN MOBILE CONTENT CENTRIC NETWORK

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jun. 8, 2012 and assigned Serial No. 10-2012-0061487, the entire disclosure of which is hereby incorporated by reference.

TECHNICAL FIELD

The present disclosure relates to a method and an apparatus for improving handover efficiency by preventing a packet loss in a mobile Content Centric Network (CCN).

BACKGROUND

To solve problems of an existing data network such as a bandwidth limitation and low reliability, the CCN proposes an approach method for a new network structure by requesting a network instead of a server to transmit contents.

A network utilizing this CCN wirelessly is called a mobile CCN, and CCNx denotes a communication protocol for realizing the CCN.

In the example where User Equipment (UE) accesses one eNB (base station) and requests contents and then performs a handover to a different eNB before or while the contents are received in the UE, the contents are transferred according to a Pending Interface Table (PIT) before a local CCNx node, and during transmission, the contents conform to a Forwarding Information Base (FIB).

In this example, however, since the UE has already performed a handover to a new eNB, the contents cannot be transferred to the UE anymore.

SUMMARY

To address the above-discussed deficiencies of the prior art, it is a primary object to provide a method and an apparatus for a handover in a mobile content centric network (CNN).

Another aspect of the present disclosure is to provide a method and an apparatus for providing contents seamlessly in a mobile CNN.

Still another aspect of the present disclosure is to provide an apparatus and a method for providing a transparent handover to user equipment (UE) in a mobile CCN.

In accordance with an aspect of the present disclosure, a handover method in a mobile content centric network (CCN) is provided. The method includes: when detecting user equipment (UE) performs a handover, caching, at a source local CCNx node, data directed to the UE; transmitting, at the source local CCNx node, a request of stopping transmission of the contents directed to the UE to a target local CCNx node depending on a specific condition; requesting, at the target local CCNx node, the source local CCNx node to stop transmission of contents that are being cached; transmitting, at the source local CCNx node, cached contents to the target local CCNx node; requesting, at the target local CCNx node, a CCNx entry node to stop transmission of specific contents to the target local CCNx node depending on a specific condition; transmitting, at the CCNx entry node, contents to the target local CCNx node; and when the target local CCNx node detects the UE completes the handover, transmitting, at the target local CCNx node, the contents received from the CCNx entry node to the UE.

In accordance with another aspect of the present disclosure, a handover method of a source local CCNx node in a mobile content centric network (CCN) is provided. The method includes: when detecting user equipment (UE) performs a handover, caching data directed to the UE; transmitting a request of stopping transmission of contents directed to the UE to a target local CCNx node depending on a specific condition; receiving a transmission stoppage request for contents that are being cached by the target local CCNx node from the target local CCNx node; and transmitting cached contents to the target local CCNx node.

In accordance with still another aspect of the present disclosure, a handover method of a target local CCNx node in a mobile content centric network (CCN) is provided. The method includes: receiving a request of stopping transmission of contents directed to user equipment (UE) from a source local CCNx node depending on a specific condition; requesting the source local CCNx node to stop transmission of contents that are being cached; receiving cached contents from the source local CCNx node; requesting a CCNx entry node to stop transmission of specific contents to the target local CCNx node depending on a specific condition; receiving the contents from the CCNx entry node; and when detecting the UE completes a handover, transmitting the contents received from the CCNx entry node to the UE.

In accordance with yet another aspect of the present disclosure, a handover method of a CCNx entry node in a mobile content centric network (CCN) is provided. The method includes: receiving stoppage of transmission of specific contents to a target local CCNx node from the target local CCNx node depending on a specific condition; and transmitting contents to the target local CCNx node.

In accordance with further another aspect of the present disclosure, an apparatus of a source local CCNx node in a mobile content centric network (CCN) is provided. The apparatus includes: a modem for communicating with other nodes; a storage for storing contents; and a controller for, when detecting user equipment (UE) performs a handover, caching data directed to the UE, transmitting a request of stopping transmission of the contents directed to the UE to a target local CCNx node depending on a specific condition, receiving a request of stopping transmission of contents that are being cached by the target local CCNx node from the target local CCNx node, and transmitting cached contents to the target local CCNx node.

In the apparatus, wherein in caching the data directed to the UE, the controller is configured to allow the source local CCNx node to request stoppage of an application of specific contents to a Pending Interface Table (PIT) for the UE.

In the apparatus, wherein in transmitting the request to stop transmission of the contents directed to the UE to the target local CCNx node based on the condition, the controller is configured to request non-retransmission of a portion of data transmitted to the UE, and stops a request of stopping applying to a Pending Interface Table (PIT) for the UE.

In the apparatus, wherein in receiving the request to stop transmission of the contents that are being cached by the target local CCNx node from the target local CCNx node, the controller is configured to receive a request to delete information regarding specific contents from a Pending Interface Table (PIT) from the target local CCNx node.

In the apparatus, wherein in transmitting the cached contents to the target local CCNx node, the controller is configured to transmit a name and a size of the cached contents.

In accordance with yet further another aspect of the present disclosure, an apparatus of a target local CCNx node in a mobile content centric network (CCN) is provided. The apparatus includes: a modem for communicating with other nodes; a storage for storing contents; and a controller for receiving a request of stopping transmission of contents directed to user equipment (UE) from a source local CCNx node depending on a specific condition, requesting the source local CCNx node to stop transmission of contents that are being cached, receiving the cached contents from the source local CCNx node, requesting a CCNx entry node to stop transmission of specific contents to the target local CCNx node depending on a specific condition, receiving contents from the CCNx entry node, and when detecting the UE completes a handover, transmitting the contents received from the CCNx entry node to the UE.

In the apparatus, wherein in receiving the request to stop transmission of the contents directed to the UE from the source local CCNx node based on the condition, the controller is configured to receive a request for non-retransmission of a portion of data transmitted to the UE, and receive a request to stop applying to a Pending Interface Table (PIT) for the UE.

In the apparatus, wherein in requesting the source local CCNx node to stop transmission of the contents that are being cached, the controller is configured to request the source local CCNx node to delete information regarding the specific contents from a Pending Interface Table (PIT).

In the apparatus, wherein in receiving the cached contents from the source local CCNx node, the controller is configured to receive a name and a size of the cached contents.

In the apparatus, wherein in requesting the CCNx entry node to stop transmission of the specific contents to the target local CCNx node based on the condition, the condition comprises: requesting stoppage of transmission of a portion of the specific contents transmitted previously.

In the apparatus, wherein in detecting the UE completing the handover, and in transmitting the contents received from the CCNx entry node to the UE, the controller is configured to resume an application-suspended request.

In accordance with still yet further another aspect of the present disclosure, an apparatus of a CCNx entry node in a mobile content centric network (CCN) is provided. The apparatus includes: a modem for communicating with other nodes; a storage for storing contents; and a controller for receiving stoppage of transmission of specific contents to a target local CCNx node from the target local CCNx node depending on a specific condition, and transmitting contents to the target local CCNx node.

In the apparatus, wherein in receiving the request to stop transmission of the specific contents to the target local CCNx node based on the condition, the condition comprises: requesting stoppage of transmission of a portion of the specific contents transmitted previously.

In the apparatus, wherein the controller is configured to receive a request to delete information regarding a source local CCNx node with respect to the specific contents from the CCNx entry node.

In accordance with further yet another aspect of the present disclosure, a handover method in a mobile content centric network (CCN) is provided. The method includes: when detecting user equipment (UE) performs a handover, caching, at a source local CCNx node, data directed to the UE; transmitting, at the source local CCNx node, a request of stopping transmission of contents directed to the UE to a target local CCNx node depending on a specific condition; requesting, at the target local CCNx node, the source local CCNx node to stop transmission of contents that are being cached; transmitting, at the source local CCNx node, the cached contents to the target local CCNx node; and when the target local CCNx node detects the UE completes the handover, transmitting, at the target local CCNx node, contents received from a CCNx entry node to the UE.

In the method, wherein caching, at the source local. CCNx node, the data directed to the UE comprises: requesting, at the source local CCNx node, stoppage of an application of the specific contents to a Pending Interface Table (PIT) for the UE.

In the method, wherein transmitting, at the source local CCNx node, the request to stop transmission of the data directed to the UE to the target local CCNx node based on the condition comprises: requesting non-retransmission of a portion of data transmitted to the UE; and stopping a request of stopping applying to a Pending Interface Table (PIT) for the UE.

In the method, wherein requesting, at the target local CCNx node, the source local CCNx node to stop transmission of the contents that are being cached comprises: requesting the source local CCNx node to delete information regarding specific contents from a Pending Interface Table (PIT).

In the method, wherein transmitting, at the source local CCNx node, the cached contents to the target local CCNx node comprises: transmitting a name and a size of the cached contents.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. Also, descriptions of well-known functions and constructions are omitted for clarity and conciseness.

Figure 1:
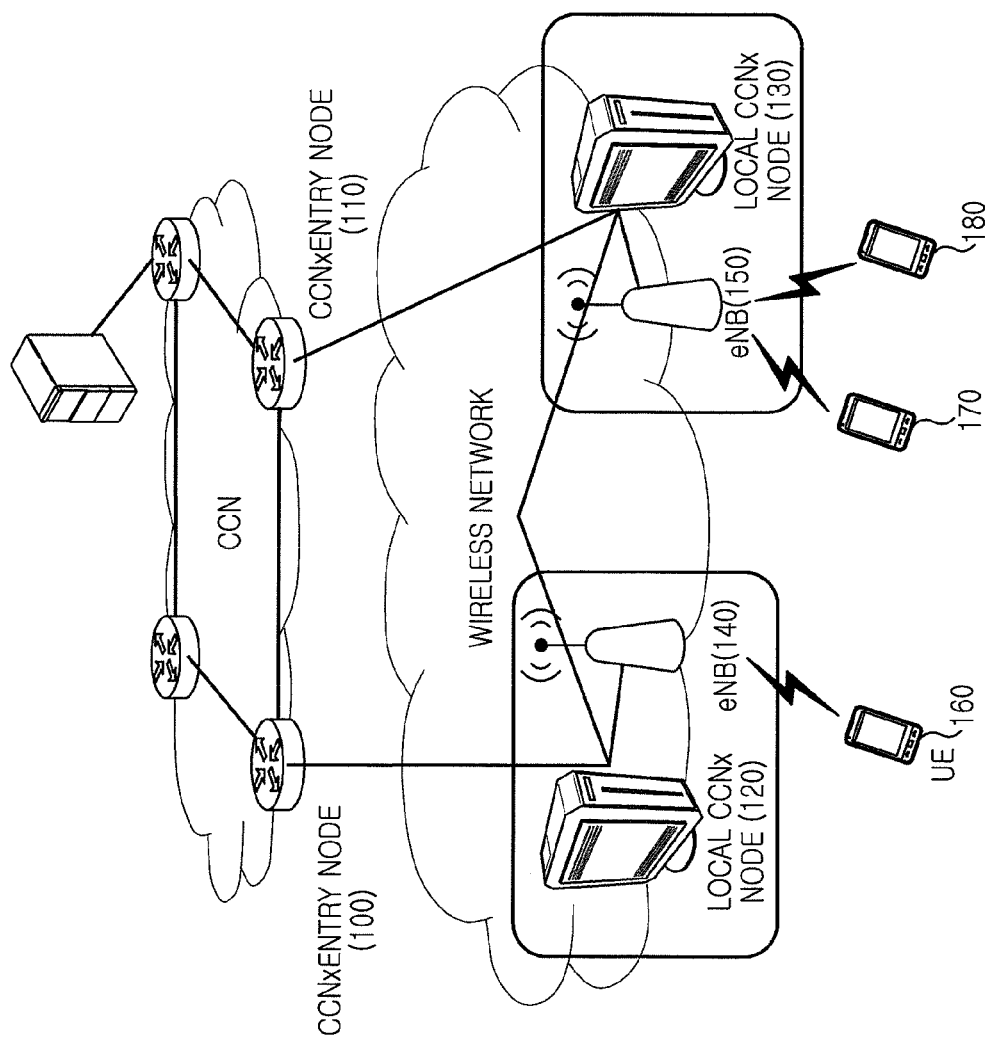
FIG. 1 illustrates a structure of a mobile CCN according to an embodiment of the present disclosure.

FIG. 1 illustrates a structure of a mobile CCN according to an embodiment of the present disclosure.

Referring to FIG. 1, in the mobile CCN, local CCNx nodes 120 and 130 are connected to eNB 140 and eNB 150, respectively, and the local CCNx nodes 120 and 130 are connected to CCNx entry nodes 100 and 110, respectively. The local CCNx nodes 120 and 130 and the CCNx entry nodes 100 and 110 have a contents store (CS) and can operate using an FIB and a PIT.

When the eNBs 140 and 150 receive a CCNx interest message from UEs 160, 170, 180, and when there exist cached contents, the local CCNx nodes 120 and 130 transmit the cached contents to the UEs.

In the example where the eNBs 140 and 150 receive CCNx contents from CCNx entry nodes 100 and 110, respectively, the local CCNx nodes 120 and 130 transmit the received CCNx contents to the UEs 160, 170, 180 via the eNBs 140 and 150.

Figure 2:
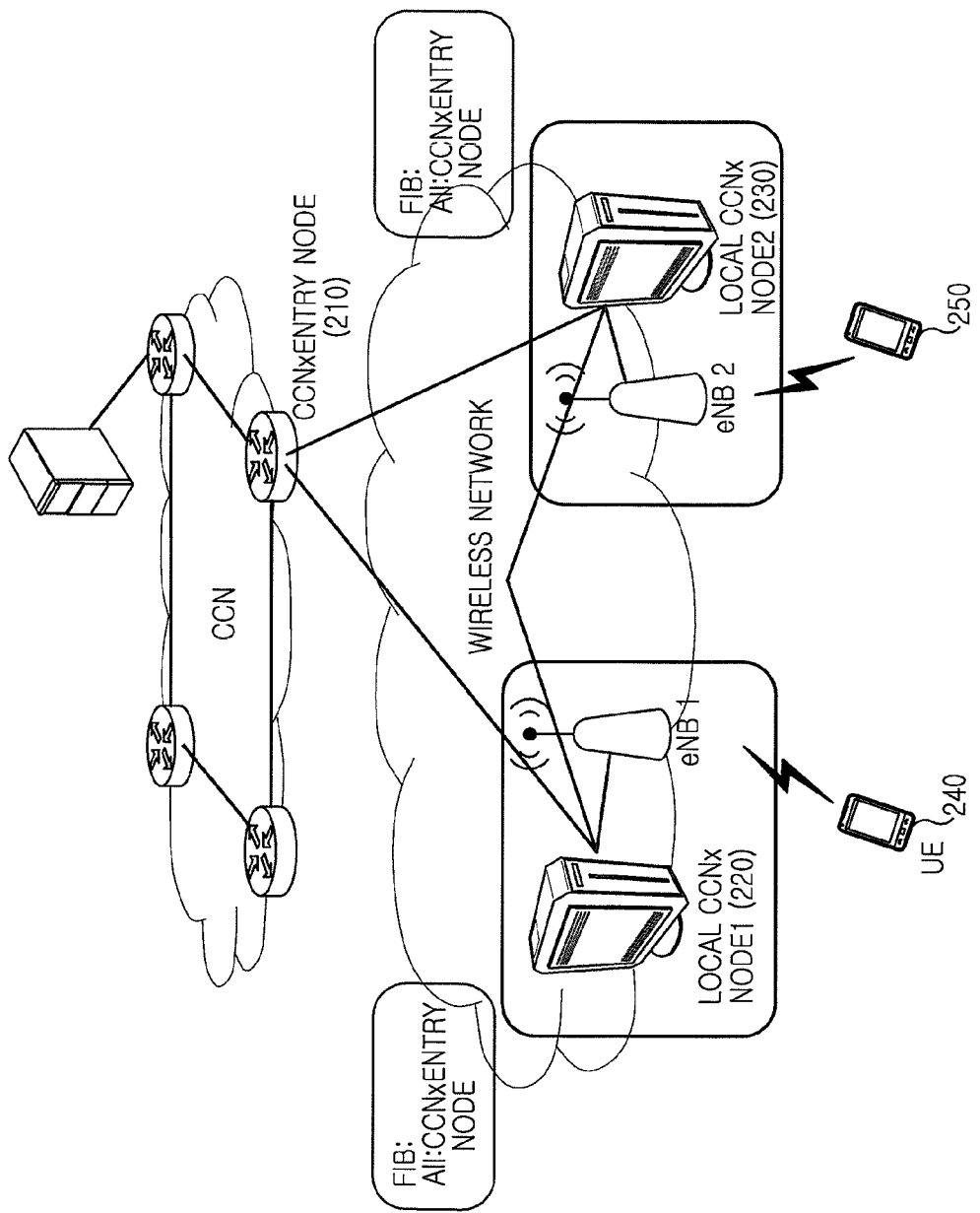
FIG. 2 illustrates an example where a neighboring local CCNx node is connected to the same CCNx entry node according to an embodiment of the present disclosure.

FIG. 2 illustrates an example where a neighboring local CCNx node is connected to the same CCNx entry node according to an embodiment of the present disclosure.

Referring to FIG. 2, all information or contents transmitted by UE 240 are transmitted to a CCNx entry node 210 via eNB 1 and a local CCNx node 1 220, and all information or contents transmitted by UE 250 are transmitted to the CCNx entry node 210 via eNB 2 and a local CCNx node 2 230 according to an FIB.

Figure 3:
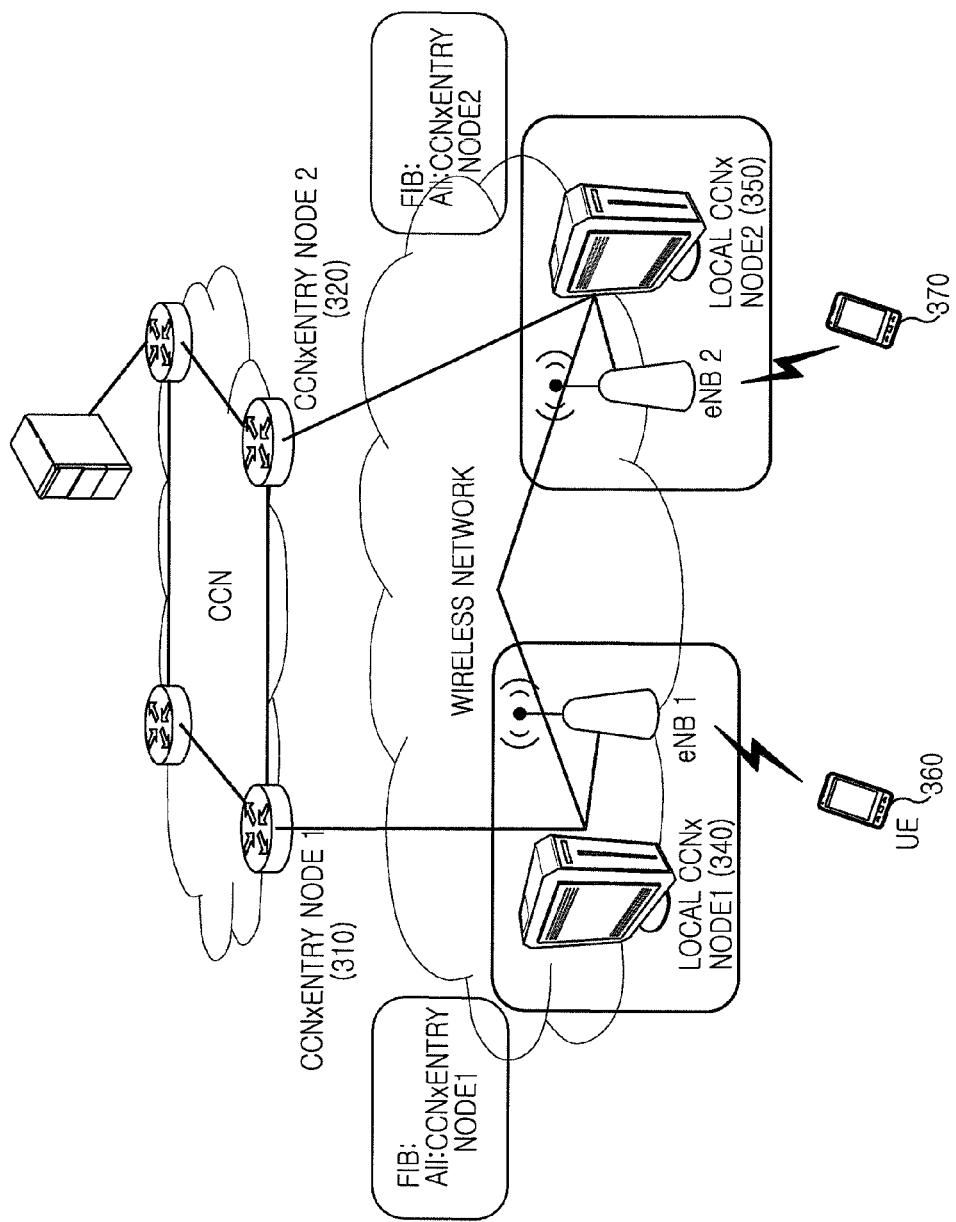
FIG. 3 illustrates an example where a neighboring local CCNx node is connected to a different CCNx entry node according to an embodiment of the present disclosure.

FIG. 3 illustrates an example where a neighboring local CCNx node is connected to a different CCNx entry node according to an embodiment of the present disclosure.

Referring to FIG. 3, all information or contents transmitted by UE 360 are transmitted to a CCNx entry node 1 310 via eNB 1 and a local CCNx node 1 340, and all information or contents transmitted by UE 370 are transmitted to a CCNx entry node 2 320 via eNB 2 and a local CCNx node 2 350 according to an FIB.

According to the present disclosure, the local CCNx node can discriminate the above-described two examples by comparing FIBs. Additionally, when a PAUSE flag is added to a PIT of a local CCNx node, the local CCNx node can stop application of the PIT.

Figures 4A, 4B:
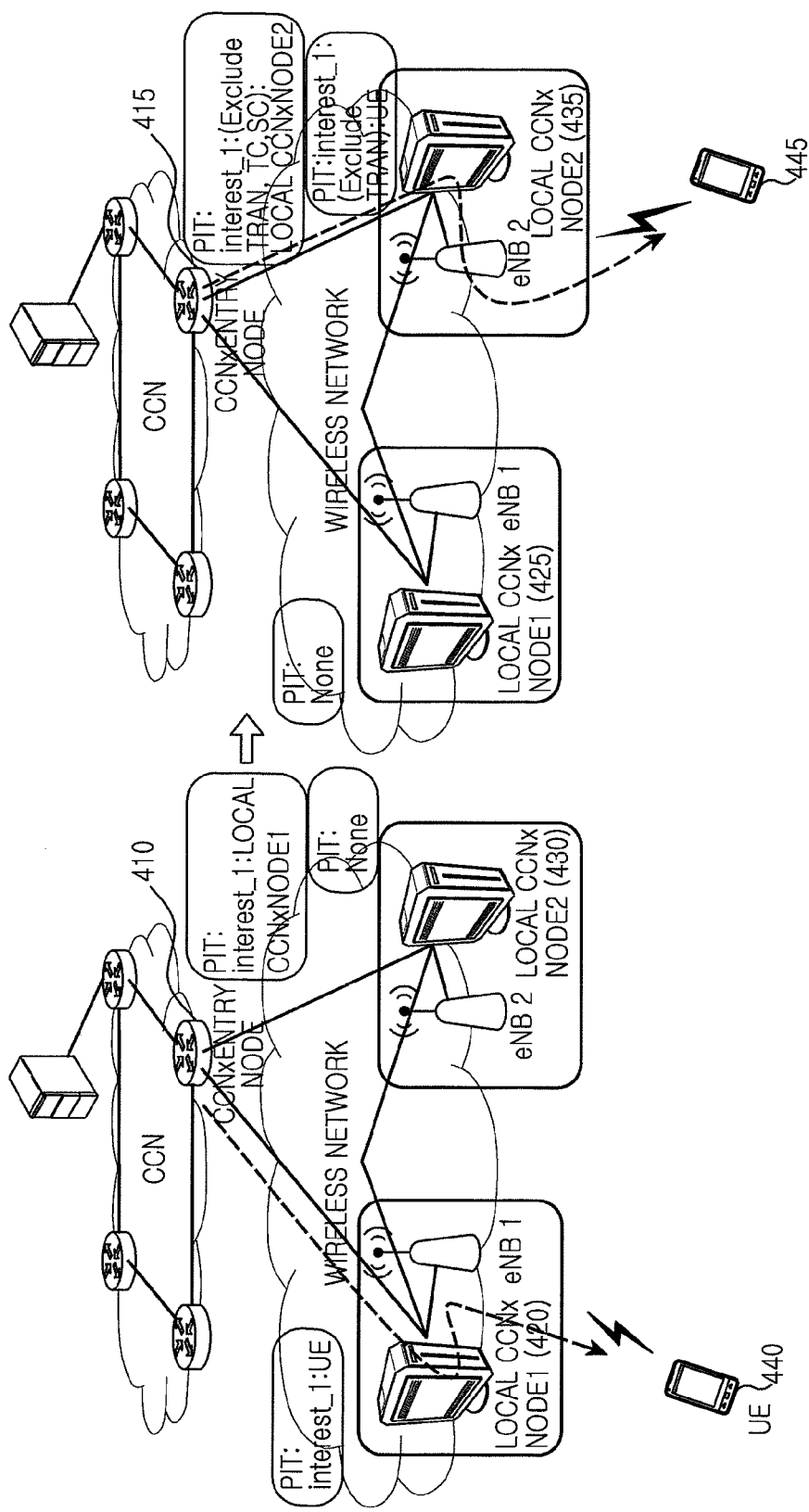
FIGS. 4A and 4B illustrate a handover process in the example where a neighboring local CCNx node is connected to the same CCNx entry node according to an embodiment of the present disclosure.

FIGS. 4A and 4B illustrate a handover process in the example where a neighboring local CCNx node is connected to the same CCNx entry node according to an embodiment of the present disclosure.

FIG. 4A illustrates an example before a handover of UE, and FIG. 4B illustrates an example after a handover of UE.

Referring to FIG. 4A, contents for "interest_1" are transferred according to a PIT in sequence of CCNx entry node 410 local CCNx node 1 420→eNB 1→UE 440.

Referring to FIG. 4B, contents for "interest_1" are transferred according to a PIT in sequence of CCNx entry node 415→local CCNx node 2 435→eNB2→UE 445.

Here, the CCNx entry node 410 and the CCNx entry node 415 are the same network entity.

Figure 5:
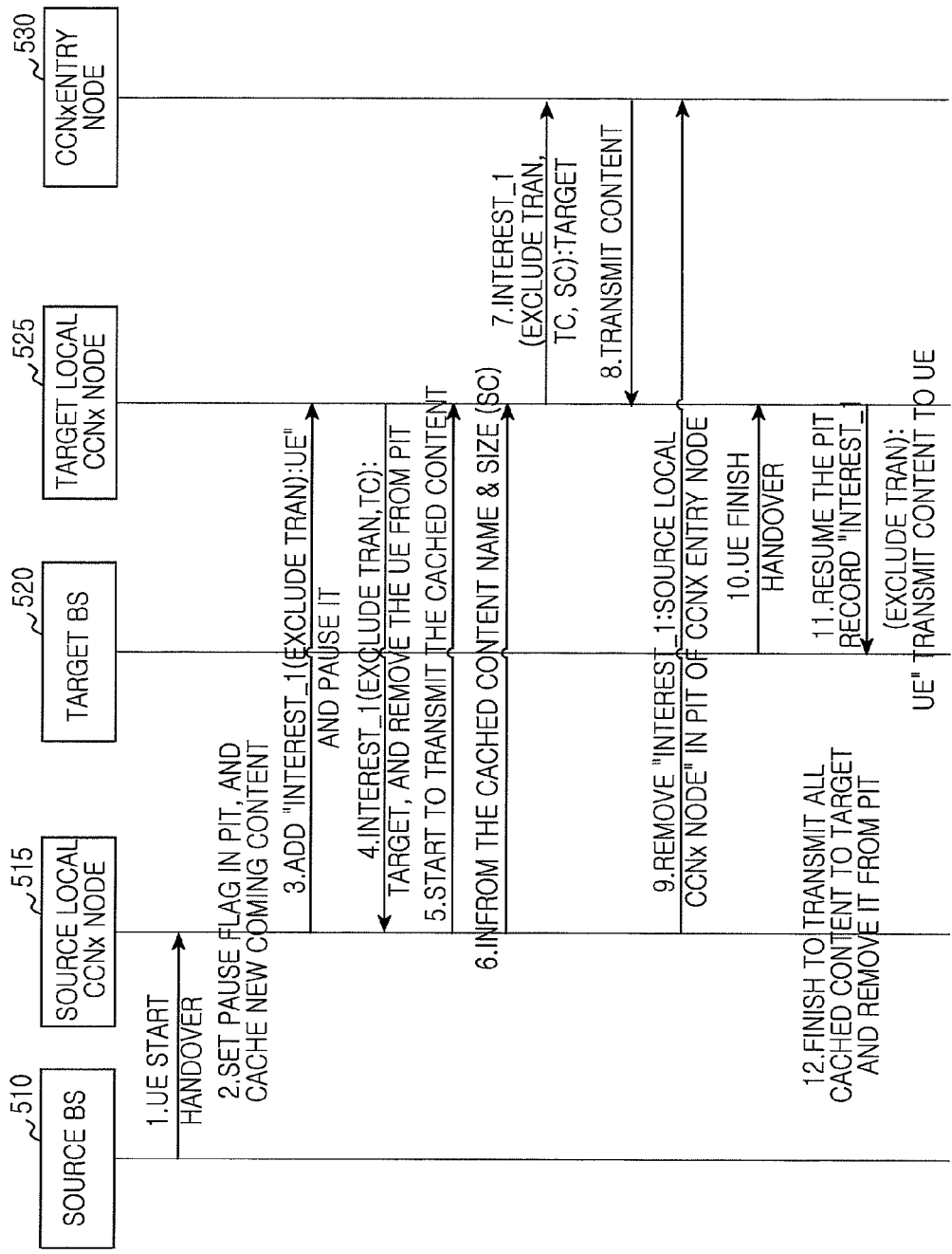
FIG. 5 illustrates a message flow of a handover process in the example where a neighboring local CCNx node is connected to the same CCNx entry node according to an embodiment of the present disclosure.

FIG. 5 illustrates a message flow of a handover process in the example where a neighboring local CCNx node is connected to the same CCNx entry node according to an embodiment of the present disclosure.

Referring to FIG. 5, when UE starts a handover, a source base station (BS) eNB transmits a message to a source local CCNx node 515 (step 1). The message is a message informing that the UE starts the handover.

After that, the source local CCNx node 515 sets a PAUSE flag at a PIT ("interest_1: UE"). After that, all contents for the interest ("interest_1: UE") are not transmitted but cached (step 2).

After that, the source local CCNx node 515 transmits an interest to a target local CCNx node 525, which adds the received interest to a PIT and sets a PAUSE flag (step 3). The interest transmitted to the target local CCNx node 525 is "interest_1 (Exclude TRAN): UE".

Here, the "TRAN" denotes the name or the size of contents transmitted to the UE. Also, "Exclude" denotes a keyword for an interest in a CCNx protocol and represents contents should not appear in a response to an interest. In other words, "Exclude" represents that contents transmitted to the UE previously are not transmitted again but contents after that should be transmitted.

The target local CCNx node 525 transmits an interest to the source local CCNx node 515 (step 4). The interest transmitted to the source local CCNx node 515 by the target local CCNx node 525 is "interest_1 (Exclude TRAN, TC): Target".

The interest represents that contents cached by the target local CCNx node 525 should not be transmitted from the source local CCNx node 515 to the target local CCNx node 525.

Here, TC denotes stored contents of the target local CCNx node 525 matching with an interest. In the example where the target local CCNx node 525 does not cache contents for the TC, the TC may not exist in the target local CCNx node 525. Also, the source local CCNx node 515 deletes "interest_1: UE" from the PIT of the source local CCNx node 515.

After that, the source local CCNx node 515 transmits contents cached or newly received for the interest to the target local CCNx node 525 (step 5).

Simultaneously with step 5, the source local CCNx node 515 informs the target local CCNx node 525 of the name and the size of cached contents (step 6). Here, SC denotes the name and the size of cached contents.

After that, the target local CCNx node 525 transmits an interest to the CCNx entry node 530 (step 7). Here, the interest is "interest_1 (Exclude TRAN, TC, SC): Target". The interest represents that transmission of the already transmitted portion of contents corresponding to SC and TC to the target local CCNx 525 is stopped.

After that, the CCNx entry node 530 starts to transmit contents to the target local CCNx node (step 8).

After that, the source local CCNx node 515 transmits an interest requesting deletion of a record regarding the source local CCNx node 515 from a PIT to the CCNx entry node 530 (step 9).

Here, the interest is "interest_1: Source Local CCNx Node". After that, the CCNx entry node 530 does not transmit contents to the source local CCNx node 515. Also, the process of step 9 may be performed after step 6 and may be performed before or after steps 7 and 8.

After that, when UE completes a handover, a target BS eNB 520 informs that the UE completes the handover by transmitting a message to the target local CCNx node 525 (step 10).

After that, the target local CCNx node 525 resumes a suspended interest "interest_1 (Exclude TRAN): UE" and transmits contents for the UE to the target base station 520 (step 11).

The source local CCNx node 515 transmits cached all contents to the target local CCNx node 525, and then deletes a record of "interest_1 (Exclude TRAN, TC): Target" from the PIT (step 12). The process of step 12 can be performed any time after step 9.

Figures 6A, 6B:
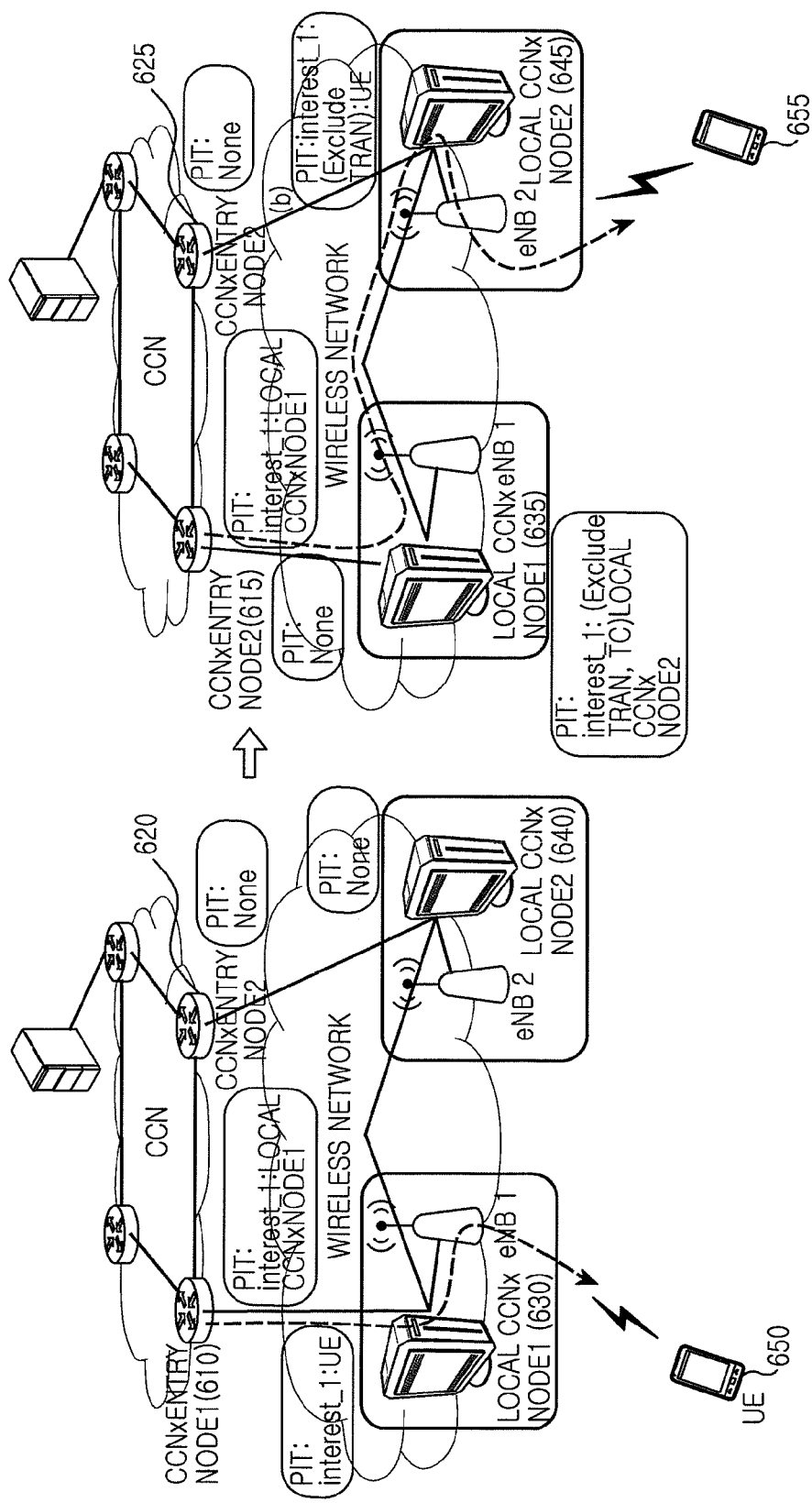
FIGS. 6A and 6B illustrate an example where a neighboring, local CCNx node is connected to a different CCNx entry node according to an embodiment of the present disclosure.

FIGS. 6A and 6B illustrate an example where a neighboring local CCNx node is connected to a different CCNx entry node according to an embodiment of the present disclosure.

FIG. 6A illustrates an example before a handover of UE and FIG. 6B illustrates an example after a handover of UE.

Referring to FIG. 6A, contents for "interest_1" are transferred according to a PIT in sequence of CCNx entry node 1 610→local CCNx node 1 630→eNB 1→UE 650.

Referring to FIG. 6B, contents for "interest_1" are transferred according to a PIT in sequence of CCNx entry node 2 615→local CCNx node 1 635→local CCNx node 2 645→eNB2→UE 655.

Figure 7:
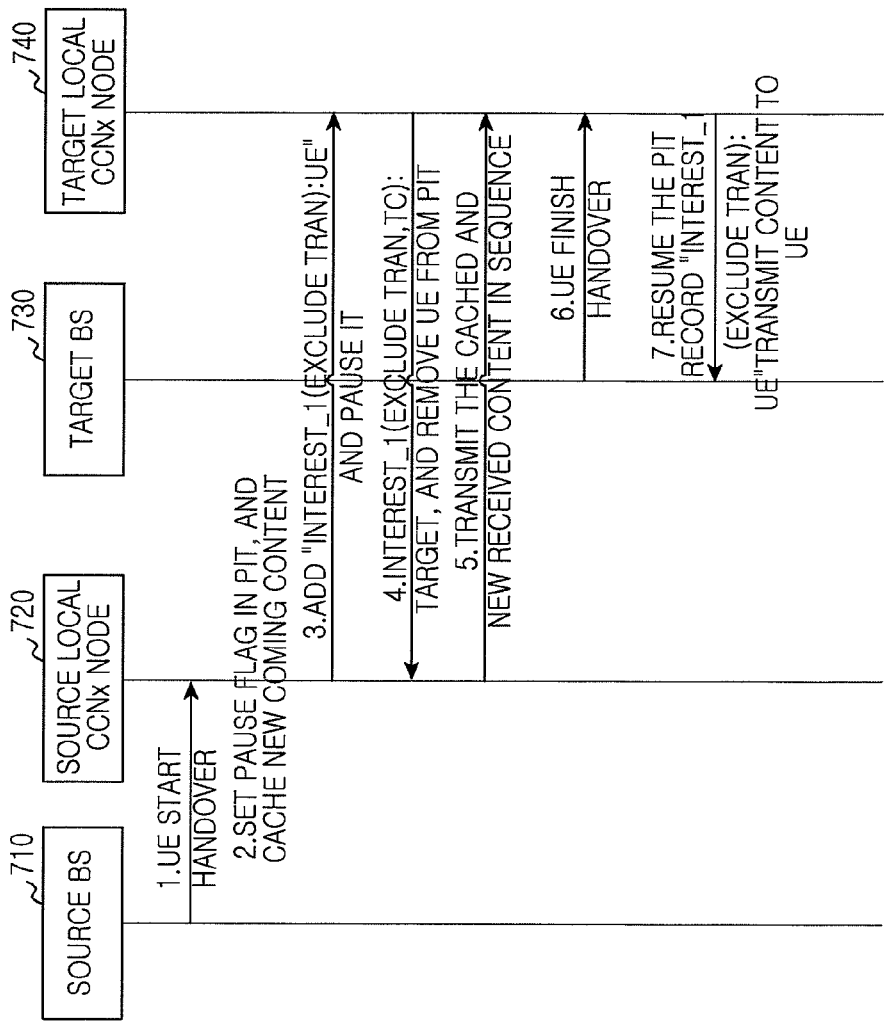
FIG. 7 illustrates a message flow of a handover process in the example where a neighboring local CCNx node is connected to a different CCNx entry node according to an embodiment of the present disclosure.

FIG. 7 illustrates a message flow of the example where a local CCNx node is connected to a different CCNx entry node according to an embodiment of the present disclosure.

Referring to FIG. 7, when UE starts a handover, a source BS eNB transmits a message to a source local CCNx node 720 (step 1). The message is a message informing that the UE starts the handover.

After that, the source local CCNx node 720 sets a PAUSE flag at a PIT ("interest_1: UE)". After that, all contents for the interest ("interest_1: UE") are not transmitted but cached (step 2).

After that, the source local CCNx node 720 transmits an interest to the target local CCNx node 730, which adds the received interest to the PIT and sets a PAUSE flag (step 3). The interest transmitted to the target local CCNx node 740 is "interest_1 (Exclude TRAN): UE".

Here, "TRAN" denotes the name or the size of contents transmitted to the UE. Also, "Exclude" denotes a keyword for an interest in a CCNx protocol and represents that contents should not appear in a response to an interest. In other words, "Exclude" represents contents that transmitted to the UE previously are not transmitted again but contents after that should be transmitted.

The target local CCNx node 740 transmits an interest to the source local CCNx node 720 (step 4). The interest transmitted to the source local CCNx node 720 by the target local CCNx node 740 is "interest_1 (Exclude TRAN, TC): Target".

The interest represents that contents cached by the target local CCNx node 740 should not be transmitted from the source local CCNx node 720 to the target local CCNx node 740.

Here, TC denotes stored contents of the target local CCNx node 740 matching with an interest. In the example where the target local CCNx node 740 does not cache contents for the TC, the TC may not exist in the target local CCNx node 740. Also, the source local CCNx node 720 deletes "interest_1: UE" from the PIT of the source local CCNx node 720.

After that, when receiving the interest, the source local CCNx node 720 transmits contents cached or newly received for the interest to the target local CCNx node 740 (step 5).

After that, when the UE completes the handover, the target base station eNB 730 informs that the UE completes the handover by transmitting a message to the target local CCNx node 740 (step 6).

After that, the target local CCNx node 525 resumes a suspended interest "interest_1 (Exclude TRAN): UE" and transmits contents for the UE to the target base station 730 (step 7).

Figure 8:
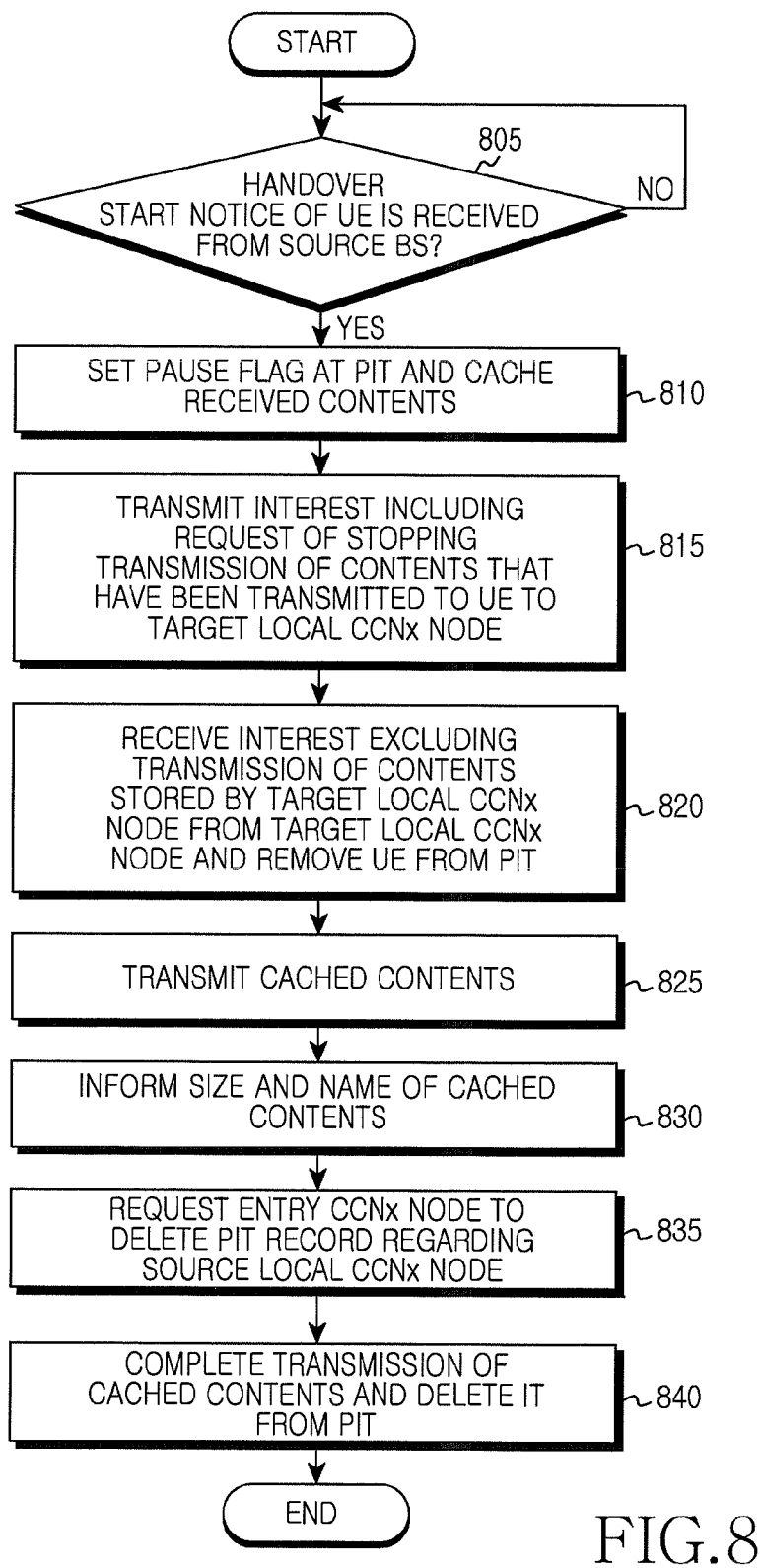
FIG. 8 illustrates a flowchart of a handover process of a source local CCNx node in the example where a neighboring local CCNx node is connected to the same CCNx entry node according to an embodiment of the present disclosure.

FIG. 8 illustrates a flowchart of a handover process of a source local CCNx node in the example where a neighboring local CCNx node is connected to the same CCNx entry node according to an embodiment of the present disclosure.

Referring to FIG. 8, in example of receiving a handover start notice of UE from a source base station (step 805), the source local CCNx node sets a PAUSE flag at a PIT and caches received contents (step 810).

After that, the source local CCNx node transmits an interest including a request of stopping transmission of contents that have been transmitted to the UE to the target local CCNx node (step 815).

After that, the source local CCNx node receives an interest excluding transmission of contents stored by the target local CCNx node from the target local CCNx node, and removes the UE from the PIT (step 820).

After that, the source local CCNx node transmits cached contents to the target local CCNx node (step 825).

After that, the source local CCNx node informs the target local CCNx node of the size and the name of the cached contents (step 830).

After that, the source local CCNx node requests an entry CCNx node to delete a PIT record for the source local CCNx node (step 835).

After that, the source local CCNx node completes transmission of the cached contents and deletes the cashed contents from the PIT (step 840).

After that, the source local CCNx node ends the algorithm according to the present disclosure.

The method described above in relation with FIG. 8 under of the present invention may be provided as one or more instructions in one or more software modules stored in the respective apparatus.

Figure 9:
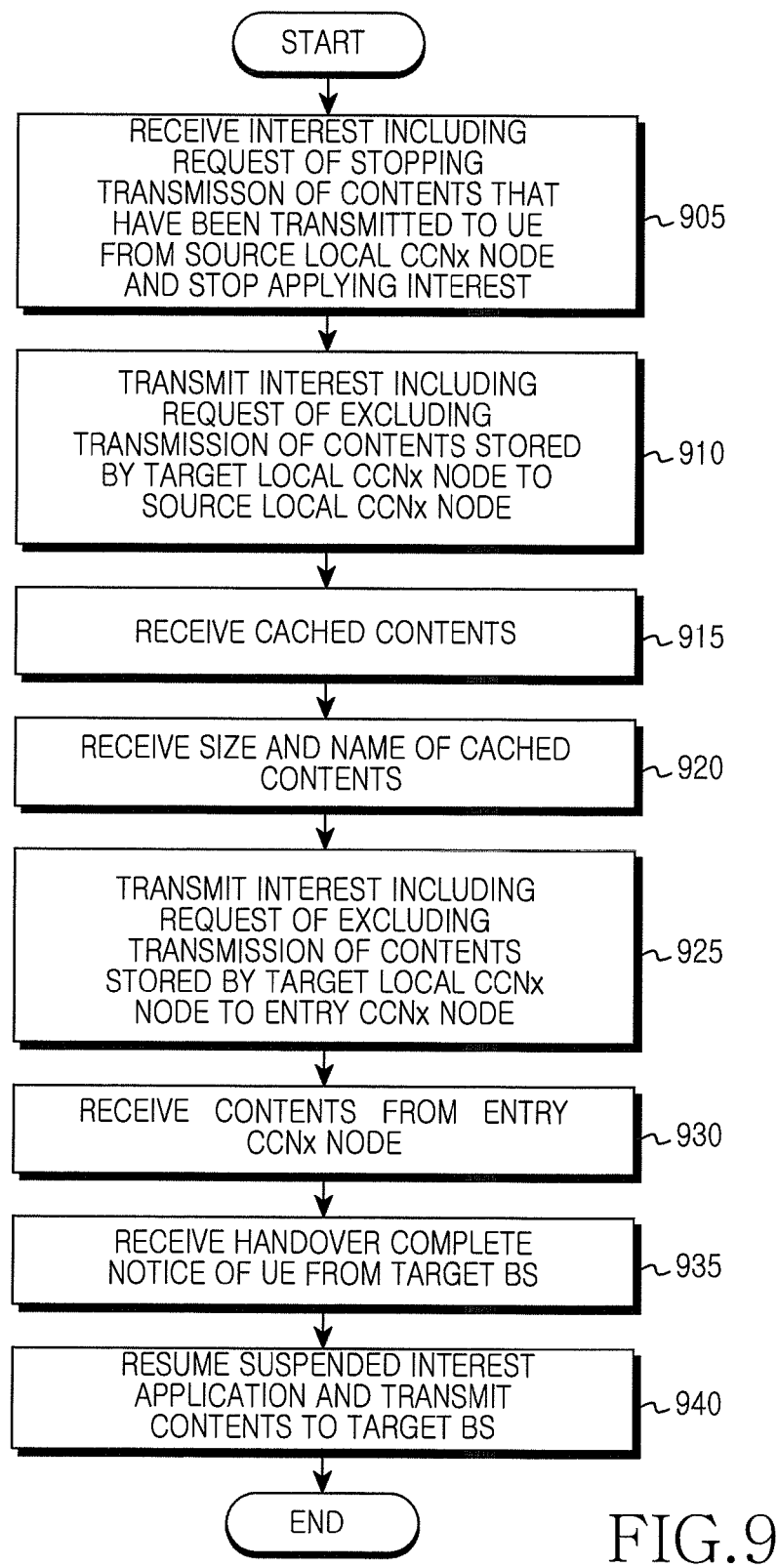
FIG. 9 illustrates a flowchart of a handover process of a target local CCNx node in the example where a neighboring local CCNx node is connected to the same CCNx entry node according to an embodiment of the present disclosure.

FIG. 9 illustrates a flowchart of a handover process of a target local CCNx node in the example where a neighboring local CCNx node is connected to the same CCNx entry node according to an embodiment of the present disclosure.

Referring to FIG. 9, the target local CCNx node receives an interest including a request of stopping transmission of contents that have been transmitted to UE from a source local CCNx node, and temporarily stops applying an interest (step 905).

After that, the target local CCNx node transmits an interest including a request of excluding transmission of contents stored by the target local CCNx node to the source local CCNx node (step 910).

After that, the target local CCNx node receives cached contents from the local CCNx node (step 915).

After that, the target local CCNx node receives the size and the name of the cached contents (step 920).

After that, the target local CCNx node transmits an interest including a request of excluding transmission of contents stored by the target local CCNx node to an entry CCNx node (step 925).

After that, the target local CCNx node receives contents from the entry CCNx node (step 930).

After that, the target local CCNx node receives a handover complete notice of UE from the target BS (step 935).

After that, the target local CCNx node resumes suspended interest application and transmits contents to the target BS (step 940).

After that, the target local CCNx node ends the algorithm according to the present disclosure.

The method described above in relation with FIG. 9 under of the present invention may be provided as one or more instructions in one or more software modules stored in the respective apparatus.

Figure 10:
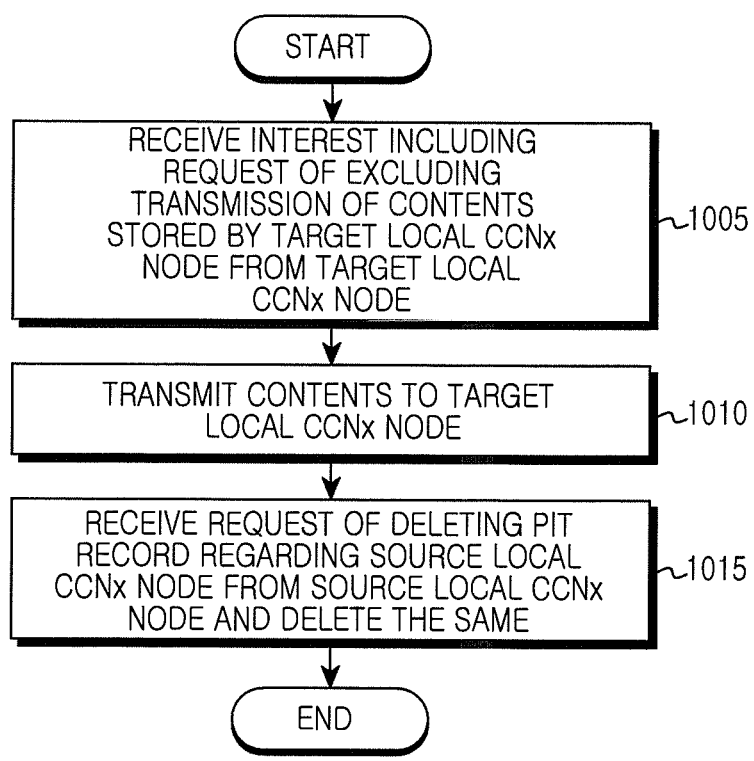
FIG. 10 illustrates a flowchart of a handover process of a CCNx entry node in the example where a neighboring local CCNx node is connected to the same CCNx entry node according to an embodiment of the present disclosure.

FIG. 10 illustrates a flowchart of a handover process of a CCNx entry node in the example where a neighboring local CCNx node is connected to the same CCNx entry node according to an embodiment of the present disclosure.

Referring to FIG. 10, the CCNx entry node receives an interest including, a request of excluding transmission of contents stored by the target local CCNx node from the target local CCNx node (step 1005).

After that, the CCNx entry node transmits contents to the target local CCNx node (step 1010).

After that, the CCNx entry node receives a PIT record delete request for the source local CCNx node from the source local CCNx node, and deletes a relevant PIT record (step 1015).

After that, the CCNx entry node ends the algorithm according to the present disclosure.

The method described above in relation with FIG. 10 under of the present invention may be provided as one or more instructions in one or more software modules stored in the respective apparatus.

Figure 11:
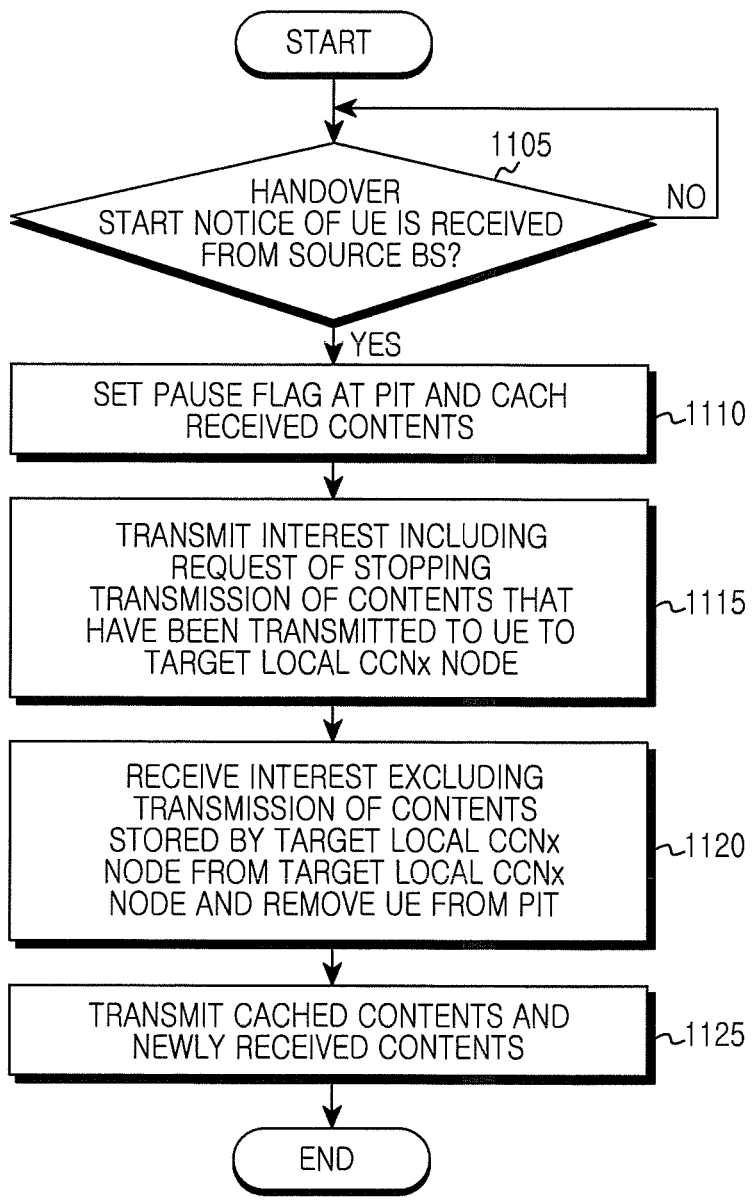
FIG. 11 illustrates a flowchart of a handover process of a source local CCNx node in the example where a neighboring local CCNx node is connected to a different CCNx entry node according to an embodiment of the present disclosure.

FIG. 11 illustrates a flowchart of a handover process of a source local CCNx node in the example where a neighboring local CCNx node is connected to a different CCNx entry node according to an embodiment of the present disclosure.

Referring to FIG. 11, the source local CCNx node receives a handover start notice of UE from a source BS (step 1105).

After that, the source local CCNx node sets a PAUSE flag at a PIT and caches received contents (step 1110).

After that, the source local CCNx node transmits an interest including a request of stopping transmission of contents that have been transmitted to UE to a target local CCNx node (step 1115).

After that, the source local CCNx node receives an interest excluding transmission of contents stored by the target local CCNx node from the target local CCNx node, and removes the UE from the PIT (step 1120).

After that, the source local CCNx node transmits cached contents and newly received contents to the target local CCNx node (step 1125).

After that, the source local CCNx node ends the algorithm according to the present disclosure.

The method described above in relation with FIG. 11 under of the present invention may be provided as one or more instructions in one or more software modules stored in the respective apparatus.

Figure 12:
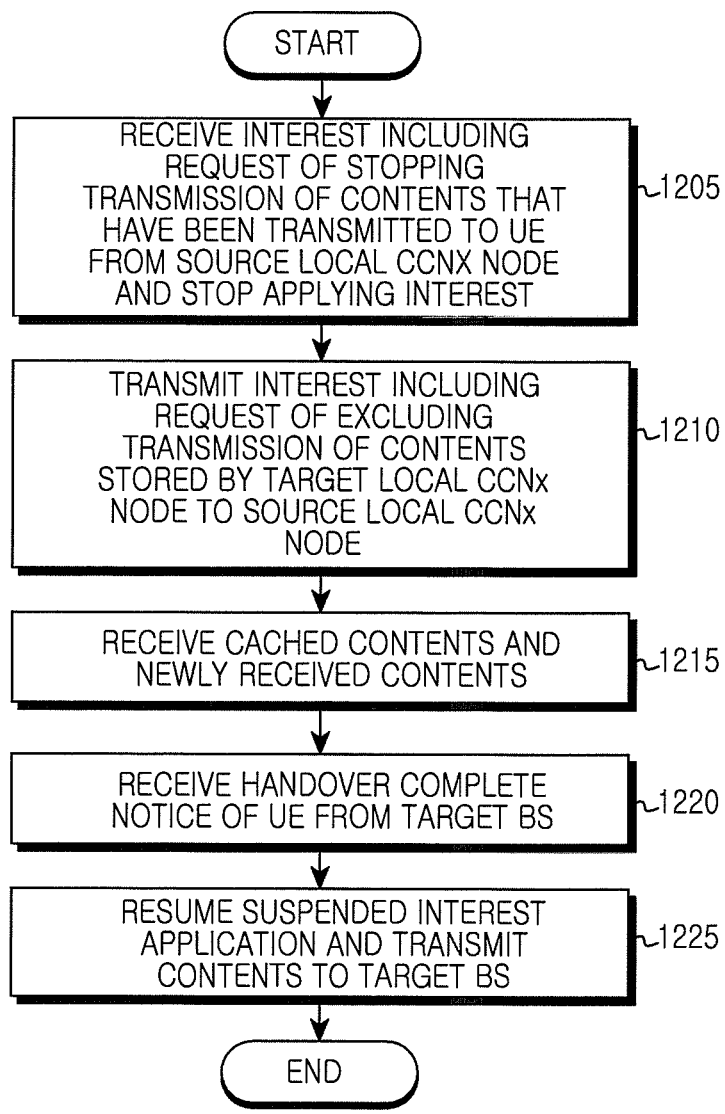
FIG. 12 illustrates a flowchart of a handover process of a target local CCNx node in the example where a neighboring local CCNx node is connected to a different CCNx entry node according to an embodiment of the present disclosure.

FIG. 12 illustrates a flowchart of a handover process of a target local CCNx node in the example where a neighboring local CCNx node is connected to a different CCNx entry node according to an embodiment of the present disclosure.

Referring to FIG. 12, the target local CCNx node receives an interest including a request of stopping transmission of contents that have been transmitted to UE from a source local CCNx node and stops applying an interest (step 1205).

After that, the target local CCNx node transmits an interest including a request of excluding transmission of contents stored by the target local CCNx node to the source local CCNx node (step 1210).

After that, the target local CCNx node receives cached contents and newly received contents (step 1215).

After that, the target local CCNx node receives a handover complete notice of UE from a target BS (step 1220).

After that, the target local CCNx node resumes suspended interest application and transmits contents to the target BS (step 1225).

After that, the target local CCNx node ends the algorithm according to the present disclosure.

Figure 13:
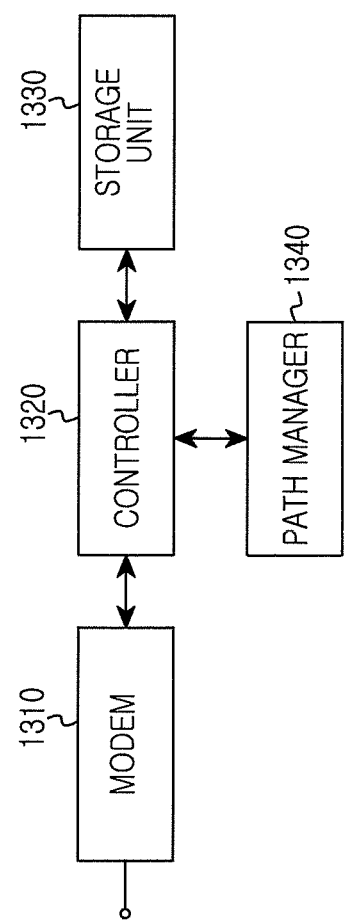
FIG. 13 illustrates a block diagram of a local CCNx node and a CCNx entry node according to an embodiment of the present disclosure.

FIG. 13 illustrates a block diagram of a local CCNx node and a CCNx entry node according to an embodiment of the present disclosure.

Referring to FIG. 13, the node includes a modem 1310, a controller 1320, a storage unit 1330, and a path manager 1340.

The modem 1310 is a module for communicating with other devices and includes a wired processor and a baseband processor. The wired processor converts a signal received via a wired path to a baseband signal, provides the same to the baseband processor, converts a baseband signal from the baseband processor to a wired signal so that the signal may be transmitted on an actual wired path, and transmits the same via the wired path.

The controller 1320 controls an overall operation of the local CCNx node and the CCNx entry node. Particularly, the controller 1320 controls the path manager 1340 according to the present disclosure.

The storage unit 1330 stores a program for controlling an overall operation of the local CCNx node and the CCNx entry node, and temporary data occurring during execution of a program. Particularly, according to an embodiment of the present disclosure, the storage unit 1330 stores contents, an FIB, and a PIT.

The path manager 1340 controls the path of contents upon a handover of UE according to a PIT and an FIB.

In the example where the node is a source local CCNx node, the path manager 1340 performs the processes of FIGS. 8 and 11. In the example where the node is a target local CCNx node, the path manager 1340 performs the processes of FIGS. 9 and 12. In the example where the node is a CCNx entry node, the path manager 1340 performs the process of FIG. 10.

The present disclosure has an advantage of providing an efficient handover technique in a mobile CCN.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A handover method of a source node in a wireless communication system, the method comprising:
in response to detecting a user equipment (UE) performing a handover, caching data directed to the UE received from an entry node;
transmitting, to a target node, a first request that the target node excludes, from transmission from the target node to the UE of the data directed to the UE, first data directed to the UE that has been transmitted by the source node to the UE;
receiving, from the target node, a second request that the source node excludes, from transmission from the source node to the target node of the cached data directed to the UE, second data directed to the UE that has been received from the entry node by the target node and cached by the target node;
and transmitting, to the target node, the cached data directed to the UE except the first and second data,
wherein the first data and the second data are excluded from the data directed to the UE transmitted from the entry node to the target node.

2. The method of claim 1, further comprising:
requesting stoppage of transmission from the source node to the UE of the data directed to the UE in a pending interface table (PIT) of the UE.

3. The method of claim 1, wherein transmitting the first request that the target node excludes, from transmission from the target node to the UE of the data directed to the UE, first data directed to the UE that has been transmitted by the source node to the UE comprises: requesting non-retransmission of a portion of data transmitted to the UE.

4. The method of claim 1, wherein receiving the second request that the source node excludes, from transmission from the source node to the target node of the cached data directed to the UE, the second data directed to the UE that has been cached by the target node comprises:
receiving a request to delete information regarding specific contents from a pending interface table (PIT) at the source node.

5. The method of claim 1, further comprising:
transmitting, to the target node, a name and a size of the data directed to the UE cached at the source node.

6. A handover method of a target node in a wireless communication system, the method comprising:
receiving, from a source node, a first request that the target node excludes, from transmission from the target node to a user equipment (UE) of data directed to the UE, first data directed to the UE that has been transmitted from the source node to the UE;
transmitting, to the source node, a second request, that the source node excludes, from transmission from the source node to the target node of data directed to the UE that is cached at the source node, second data directed to the UE that has been received from an entry node by the target node and cached by the target node;

receiving, from the source node, cached data directed to the UE cached by the source node except the second data;

transmitting, to the entry node, a third request that the entry node excludes, from a transmission of the data directed to the UE from the entry node to the target node, the second data and the cached data from the source node;

receiving, from the entry node, data directed to the UE except the first data, the second data, and the cached data from the source node; and in response to detecting the UE completing a handover, transmitting to the UE, contents of the data directed to the UE received from the entry node.

7. The method of claim 6, wherein receiving the first request that the target node excludes, from transmission from the target node to the UE of data directed to a user equipment (UE), first data directed to the UE that has been transmitted from the source node to the UE comprises:

receiving a request for non-retransmission of a portion of data transmitted to the UE.

8. The method of claim 6, wherein transmitting the second request that the source node excludes, from transmission from the source node to the target node of data directed to the UE that is cached at the source node, second data directed to the UE that has been cached by the target node comprises:

requesting the source node to delete information regarding the UE from a pending interface table (PIT).

9. The method of claim 6, wherein receiving, from the source node, data directed to the UE except the second data comprises:

receiving a name and a size of the cached data directed to the UE except the second data.

10. The method of claim 6, wherein transmitting the third request that the entry node excludes, from a transmission of the data directed to the UE from the entry node to the target node, the second data and the cached data comprises:

requesting, by the target node, that the entry node excludes, from the transmission of the data directed to the UE from the entry node to the target node, the first data.

11. The method of claim 6, wherein transmitting from the target node to the UE, the contents of the data directed to the UE received from the entry node comprises:

resuming an application-suspended request.

12. A handover method of an entry node in a wireless communication system, the method comprising:

receiving a request, from a target node, that the entry node to excludes, from a transmission of data directed to a user equipment (UE) from the entry node to the target node, data directed to the UE that has been cached by the target node; and transmitting, by the entry node to the target node, data directed to the UE except first data, second data and the cached data, wherein the first data has been transmitted from a source node to the UE, and wherein the second data has been transmitted from the source node to the target node.

13. The method of claim 12, further comprising:

excluding, from a transmission from the entry node to the target node of the data directed to the UE, second data directed to the UE that has been transmitted previously from a source node to the UE.

14. The method of claim 12, further comprising:

receiving a request to delete information from the entry node regarding a source node with respect to the source node.

15. An apparatus of a source node in a wireless communication system, the apparatus comprising:

a transceiver;

a storage unit configured to store contents; and at least one processor, wherein the at least one processor is configured to control to:

in response to detecting a user equipment (UE) performing a handover, cache data directed to the UE received from an entry node, transmit, to a target node, a first request that the target node excludes, from transmission from the target node to the UE of the data directed to the UE, first data directed to the UE that has been transmitted by the source node to the UE, receive, from the target node, a second request that the source node excludes, from transmission from the source node to the target node of the cached data directed to the UE, second data directed to the UE that has been received from the entry node by the target node and cached by the target node, and transmit, to the target node, cached data directed to the UE except the first and second data, wherein the first data and the second data are excluded from the data directed to the UE transmitted from the entry node to the target node.

16. The apparatus of claim 15 wherein the at least one processor is configured to control to request stoppage of transmission from the source node to the UE of the data directed to the UE in a pending interface table (PIT) for the UE.

17. The apparatus of claim 15 wherein the at least one processor is configured to control to request non-retransmission of a portion of data transmitted to the UE.

18. The apparatus of claim 15, wherein the at least one processor is configured to control to receive a request to delete, from the source node, information regarding the second data from a pending interface table (PIT) at the source node.

19. The apparatus of claim 15, wherein the at least one processor is configured to control to transmit a name and a size of the data directed to the UE cached at the source node.

20. An apparatus of a target node in a wireless communication system, the apparatus comprising:

a transceiver;

a storage unit configured to store contents; and at least one processor, wherein the at least one processor is configured to control to:

receive, from a source node, a first request that the target node excludes, from transmission from the target node to user equipment (UE) of data directed to the UE, first data directed to the UE that has been transmitted from a source node to the UE, transmit, to the source node, a second request that the source node excludes, from transmission from the source node to the target node of data directed to the UE that is cached at the source node, second data directed to the UE that has been received from an entry node by the target node and cached by the target node, receive, from the source node, data directed to the UE cached by the source node except the second data, transmit, to the entry node, a third request that the entry node excludes, from a transmission of the data directed to the UE from the entry node to the target node, the second data and the cached data from the source node, receive, from the entry node at the target node, data directed to the UE except the first data, the second data, and the cached data from the source node, and in response to detecting the UE completing a handover, transmit, from the target node to the UE, contents of the data directed to the UE received from the entry node.

21. The apparatus of claim 20 wherein the at least one processor is configured to control to receive a request for non-retransmission of a portion of data transmitted to the UE.

22. The apparatus of claim 20, wherein the at least one processor is configured to control to request the source node to delete information regarding the UE from a pending interface table (PIT).

23. The apparatus of claim 20, wherein the at least one processor is configured to control to receive a name and a size of the data directed to the UE except the second data.

24. The apparatus of claim 20, wherein the at least one processor is configured to control to request, by the target node, that the entry node exclude, from a transmission from the entry node to the target node of the data directed to the UE, second data directed to the UE that has been transmitted previously from the source node to the UE.

25. The apparatus of claim 20, wherein the at least one processor is configured to control to resume an application-suspended request.

26. An apparatus of an entry node in a wireless communication system, the apparatus comprising:

a transceiver;

a storage unit configured to store contents; and at least one processor, wherein the at least one processor is configured to control to:

receive, from a target node, a request to exclude, from a transmission of data directed to a user equipment (UE) from the entry node to the target node, data directed to the UE that has been cached by the target node, and transmit, by the entry node to the target node, data directed to the UE except first data, second data, and the cached data, wherein the first data has been transmitted from a source node to the UE, and wherein the second data has been transmitted from the source node to the target node.

27. The apparatus of claim 26, wherein the at least one processor is configured to control to exclude, from a transmission from the entry node to the target node of the data directed to the UE, second data directed to the UE that has been transmitted previously from the source node to the UE.

28. The apparatus of claim 26, wherein at least one processor is configured to control to receive a request to delete information from the entry node regarding a source node with respect to the source node.

* * * * *